United States Patent
Wang et al.

(10) Patent No.: US 11,616,663 B2
(45) Date of Patent: Mar. 28, 2023

(54) METHOD AND APPARATUS OF PARAMETER TRACKING FOR CSI ESTIMATION

(71) Applicant: Samsung Electronics Co., Ltd., Suwon-si (KR)

(72) Inventors: Rui Wang, San Jose, CA (US); Yang Li, Plano, TX (US); Junmo Sung, Allen, TX (US); Yeqing Hu, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/143,130

(22) Filed: Jan. 6, 2021

(65) Prior Publication Data

US 2021/0218601 A1 Jul. 15, 2021

Related U.S. Application Data

(60) Provisional application No. 63/060,956, filed on Aug. 4, 2020, provisional application No. 62/959,324, filed on Jan. 10, 2020.

(51) Int. Cl.
*H04L 25/02* (2006.01)
*H04W 24/08* (2009.01)
*H04B 7/0452* (2017.01)

(52) U.S. Cl.
CPC ...... *H04L 25/0204* (2013.01); *H04L 25/0242* (2013.01); *H04W 24/08* (2013.01); *H04B 7/0452* (2013.01)

(58) Field of Classification Search
CPC .................................................. H04L 25/0204
See application file for complete search history.

(56) References Cited

U.S. PATENT DOCUMENTS

| 2014/0254534 | A1  | 9/2014 | Zhang |
| 2015/0085690 | A1* | 3/2015 | Yi ........................ H04L 25/0204 370/252 |

(Continued)

FOREIGN PATENT DOCUMENTS

| EP | 4044537 A1 | 8/2022 |
| WO | 2018/231110 A1 | 12/2018 |
| WO | 2020067740 A1 | 4/2020 |

OTHER PUBLICATIONS

International Search Report and Written Opinion of the International Searching Authority in connection with International Application No. PCT/KR2021/000233 dated Apr. 14, 2021, 9 pages.

(Continued)

*Primary Examiner* — Hsinchun Liao

(57) ABSTRACT

Methods and apparatuses in a wireless communication system. A method of operating a base station (BS) includes receiving information of uplink transmissions; storing the received information; performing, based on the received information, channel parameter tracking operations to generate channel parameters, wherein the channel parameter tracking operations are configured with different configuration parameters; and performing, based on the channel parameters, a channel coefficient prediction operation to generate channel state information (CSI).

20 Claims, 10 Drawing Sheets

(56) References Cited

U.S. PATENT DOCUMENTS

| | | | |
|---|---|---|---|
| 2016/0113010 A1 | 4/2016 | Asplund et al. | |
| 2016/0380712 A1 | 12/2016 | Levy | |
| 2018/0302213 A1 | 10/2018 | Bose et al. | |
| 2019/0223140 A1* | 7/2019 | Grossmann | H04W 48/10 |
| 2020/0099432 A1* | 3/2020 | Maattanen | H04L 5/00 |

OTHER PUBLICATIONS

"3rd Generation Partnership Project; Technical Specification Group Radio Access Network; NR; Physical channels and modulation (Release 16)", 3GPP TS 38.211 v16.2.0, Jun. 2020, 131 pages.

"3rd Generation Partnership Project; Technical Specification Group Radio Access Network; NR; Multiplexing and channel coding (Release 16)", 3GPP TS 38.212 v16.2.0, Jun. 2020, 151 pages.

"3rd Generation Partnership Project; Technical Specification Group Radio Access Network; NR; Physical layer procedures for control (Release 16)", 3GPP TS 38.213 v16.2.0, Jun. 2020, 176 pages.

Extended European Search Report dated Nov. 14, 2022 regarding Application No. 21738721.6, 10 pages.

Komninakis et al., "Multi—Input Multi—Output Fading Channel Tracking and Equalization Using Kalman Estimation", IEEE Transactions on Signal Processing, vol. 50, No. 5, May 2002, pp. 1065-1076.

* cited by examiner

METHOD AND APPARATUS OF PARAMETER TRACKING FOR CSI ESTIMATION

CROSS-REFERENCE TO RELATED APPLICATIONS AND CLAIM OF PRIORITY

The present application claims priority to U.S. Provisional Patent Application No. 62/959,324, filed on Jan. 10, 2020 and U.S. Provisional Patent Application No. 63/060,956, filed on Aug. 4, 2020. The content of the above-identified patent document is incorporated herein by reference.

TECHNICAL FIELD

The present disclosure relates generally to wireless communication systems and, more specifically, the present disclosure relates to parameter tracking for channel state information (CSI) estimation.

BACKGROUND

Massive MIMO (mMIMO) technology is an important technology to improve the spectral efficiency of $4^{th}$ generation (4G) and 5G cellular networks. A number of antennas in mMIMO is typically much larger than the number of user equipment (UE), which allows base station (BS) to perform multi-user downlink (DL) beamforming to schedule parallel data transmission on the same time-frequency resources. However, performance of mMIMO depends heavily on the quality of CSI at a BS. It has been recently verified that the multi user-MIMO (MU-MIMO) performance degrades according to UE mobility.

SUMMARY

The present disclosure relates to wireless communication systems and, more specifically, the present disclosure relates to parameter tracking for CSI estimation.

In one embodiment, a base station (BS) in a wireless communication system is provided. The BS comprises a transceiver configured to receive information of uplink transmissions. The BS further comprises a processor operably connected to the transceiver, the processor configured to store the received information, perform, based on the received information, channel parameter tracking operations to generate channel parameters, wherein the channel parameter tracking operations are configured with different configuration parameters, and perform, based on the channel parameters, a channel coefficient prediction operation to generate channel state information (CSI).

In another embodiment, a method of a base station (BS) in a wireless communication system is provided. The method comprises: receiving information of uplink transmissions; storing the received information; performing, based on the received information, channel parameter tracking operations to generate channel parameters, wherein the channel parameter tracking operations are configured with different configuration parameters; and performing, based on the channel parameters, a channel coefficient prediction operation to generate channel state information (CSI).

In yet another embodiment, a non-transitory computer-readable medium comprising program code is provided. The non-transitory computer-readable medium, that when executed by at least one processor, causes a base station (BS) to: receive information of uplink transmissions; store the received information; perform, based on the received information, channel parameter tracking operations to generate channel parameters, wherein the channel parameter tracking operations are configured with different configuration parameters; and perform, based on the channel parameters, a channel coefficient prediction operation to generate channel state information (CSI).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
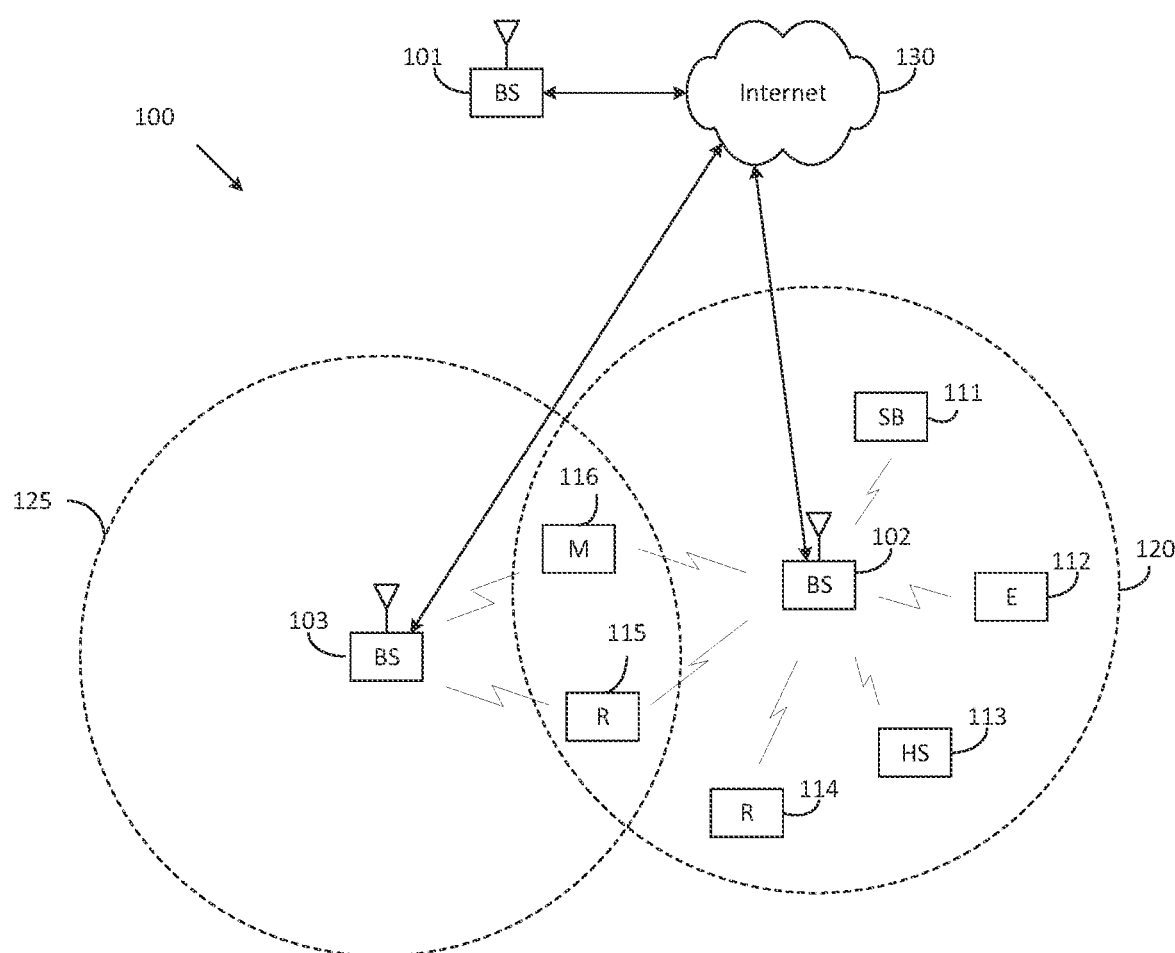
FIG. 1 illustrates an example wireless network according to embodiments of the present disclosure.
Figure 2:
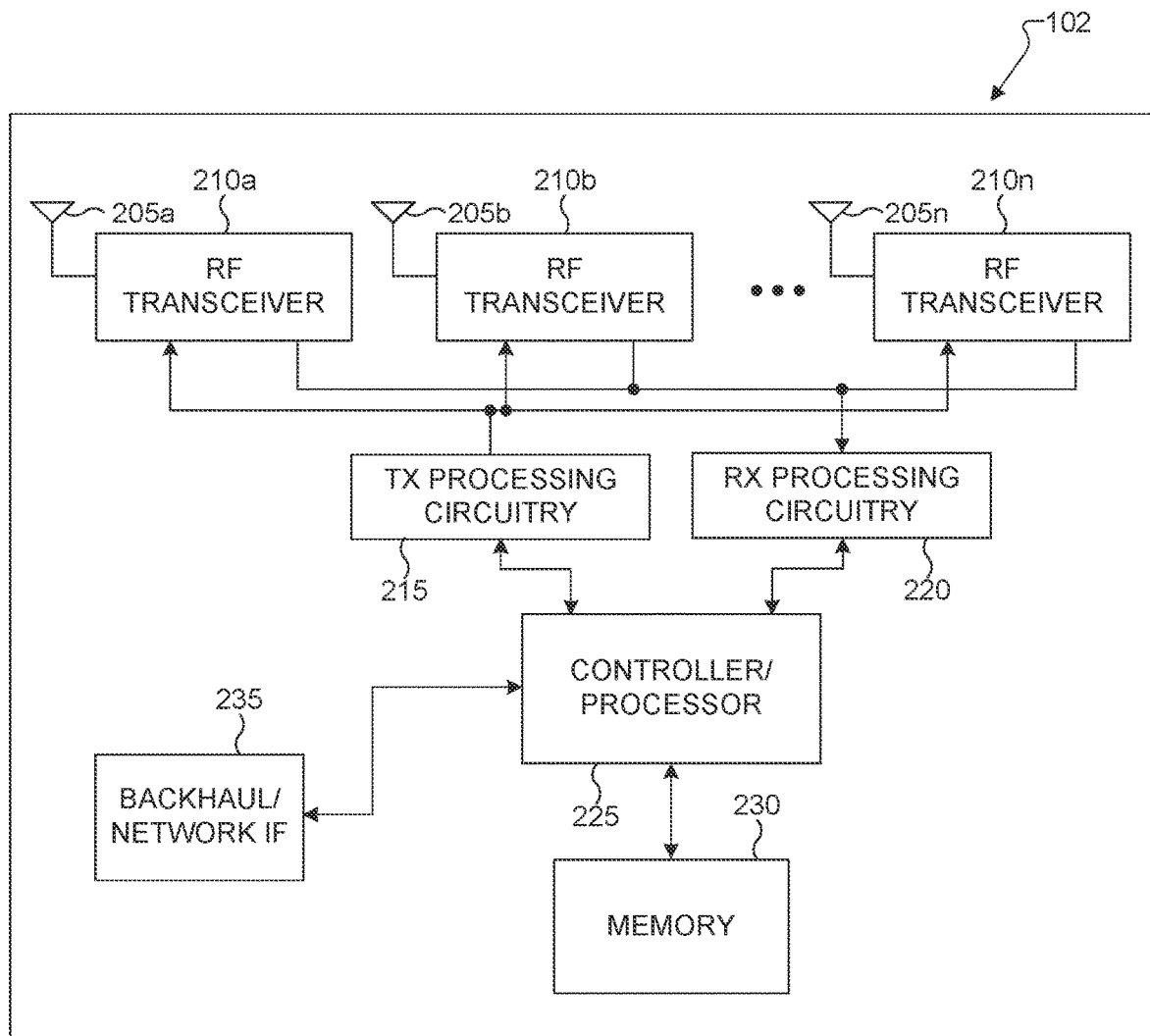
FIG. 2 illustrates an example gNB according to embodiments of the present disclosure.
Figure 3:
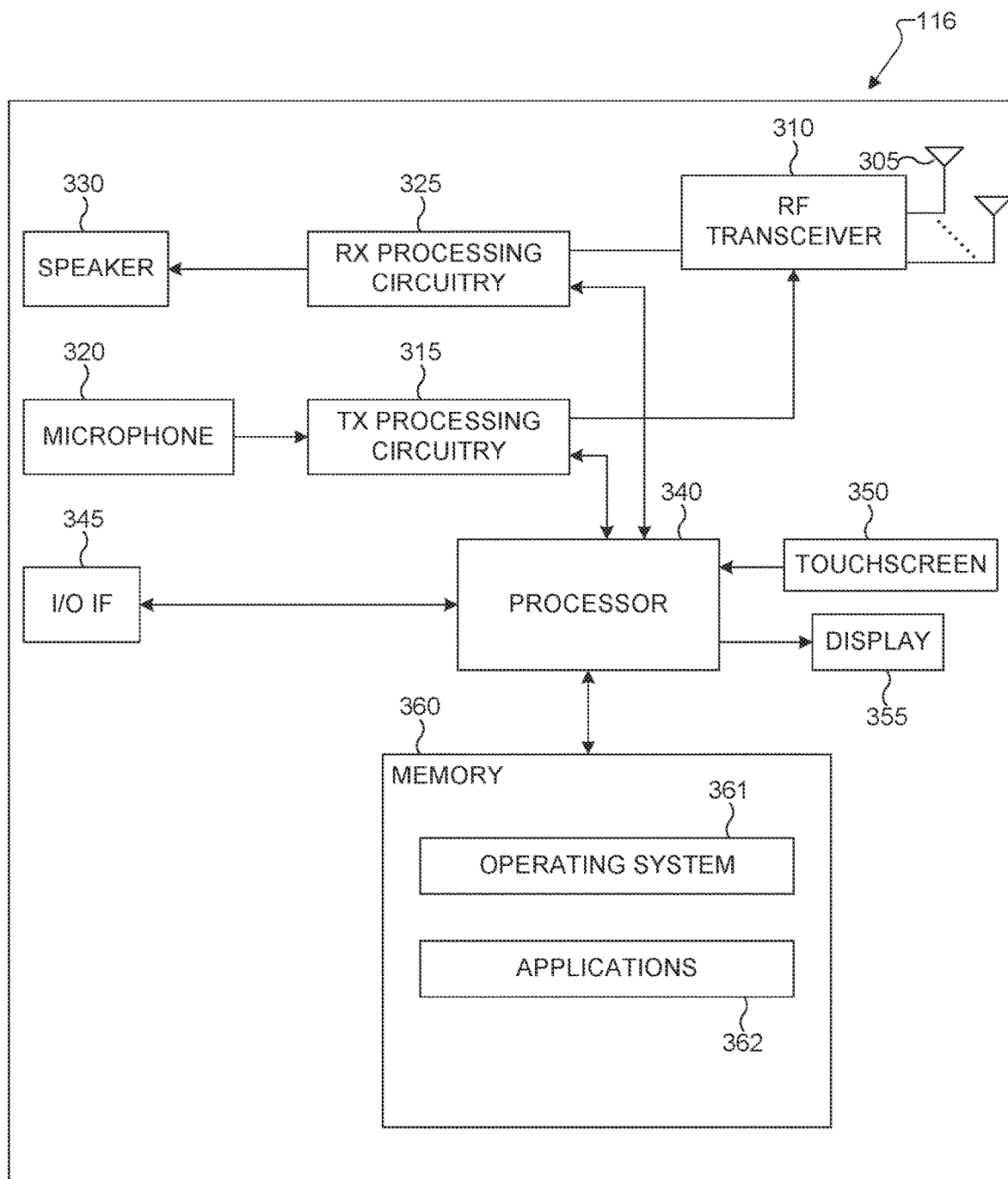
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for UEs. In certain embodiments, and one or more of the gNBs 101-103 includes circuitry, programing, or a combination thereof for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
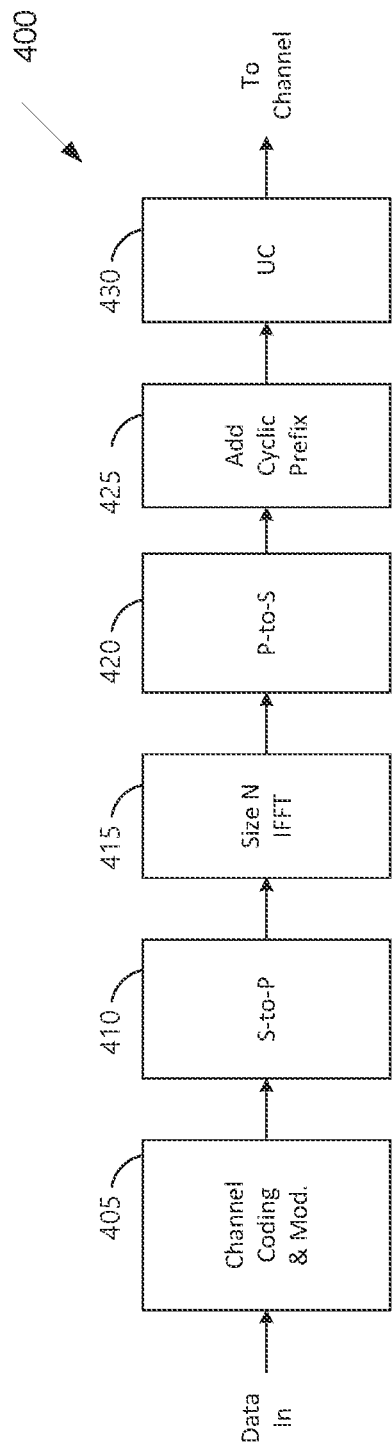
FIG. 4 illustrates an example DL slot structure according to embodiments of the present disclosure.
Figure 5:
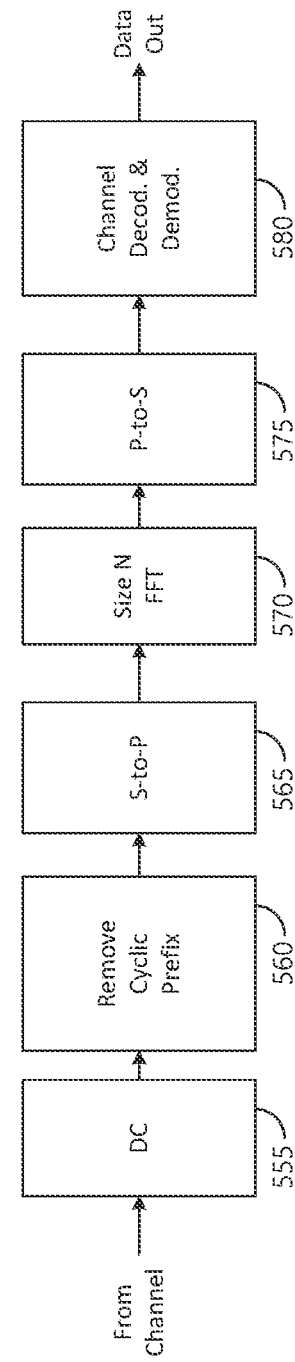
FIG. 5 illustrates an example UL slot structure for PUSCH transmission or PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it may be understood that the receive path 500 can be implemented in an gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
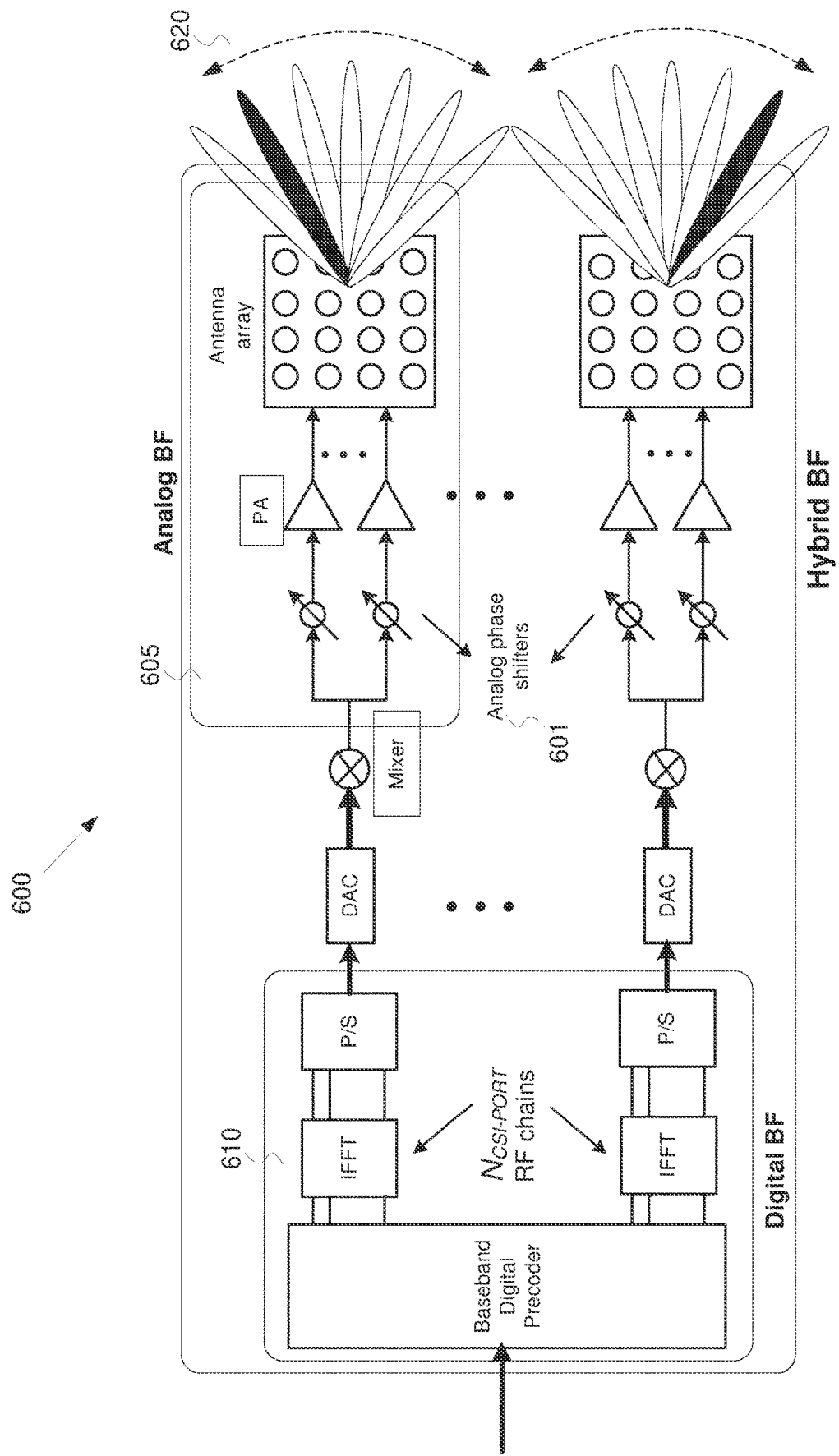
FIG. 6 illustrates an example beam forming architecture according to embodiments of the present disclosure.

FIG. 6 illustrates an example beam forming architecture 600 according to embodiments of the present disclosure. An embodiment of the beam forming architecture 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs) at mmWave frequencies) as illustrated by beamforming architecture 600 in FIG. 6.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

The channel state information is quickly out-of-date for a mMIMO BS which relies on sounding reference signal sent by a UE in a network. This greatly reduces the performance of mMIMO DL MU-MIMO transmission with mobile UEs.

The present disclosure discloses a new channel estimation and tracking method for mMIMO CSI acquisitions. The apparatus comprises a control unit that determines configuration and triggers operation for different parameter tracking modules, and a processor to update channel and parameter buffers, estimate channel parameters, and predict channel coefficients. The channel model comprises channel parameters that represent signal strength, signal delay and Doppler shift. A sequential parameter update scheme is disclosed, where signal strength, signal delay and Doppler shift are updated sequentially based on past and new channel measurements. Predicted channel coefficients comprise prediction from the estimated multipath model as well as adaptively filtered residual signal, which is the difference between the input CSI and reconstructed CSI from the multipath model. The provided embodiments have several benefits, such as reduced complexity, improved numerical stability and algorithmic flexibility.

The present disclosure provides new methods and apparatus for mMIMO CSI acquisitions. A mMIMO BS for CSI estimation comprises a transceiver configured to receive sounding reference signal (SRS) and DMRS from PUSCH from a UE, a control unit that determines configuration and triggers operation for different parameter tracking modules, and a processor to update channel and parameter buffers, estimate channel parameters, and predict channel coefficients. The overall architecture is illustrated in FIG. 7.

Figure 7:
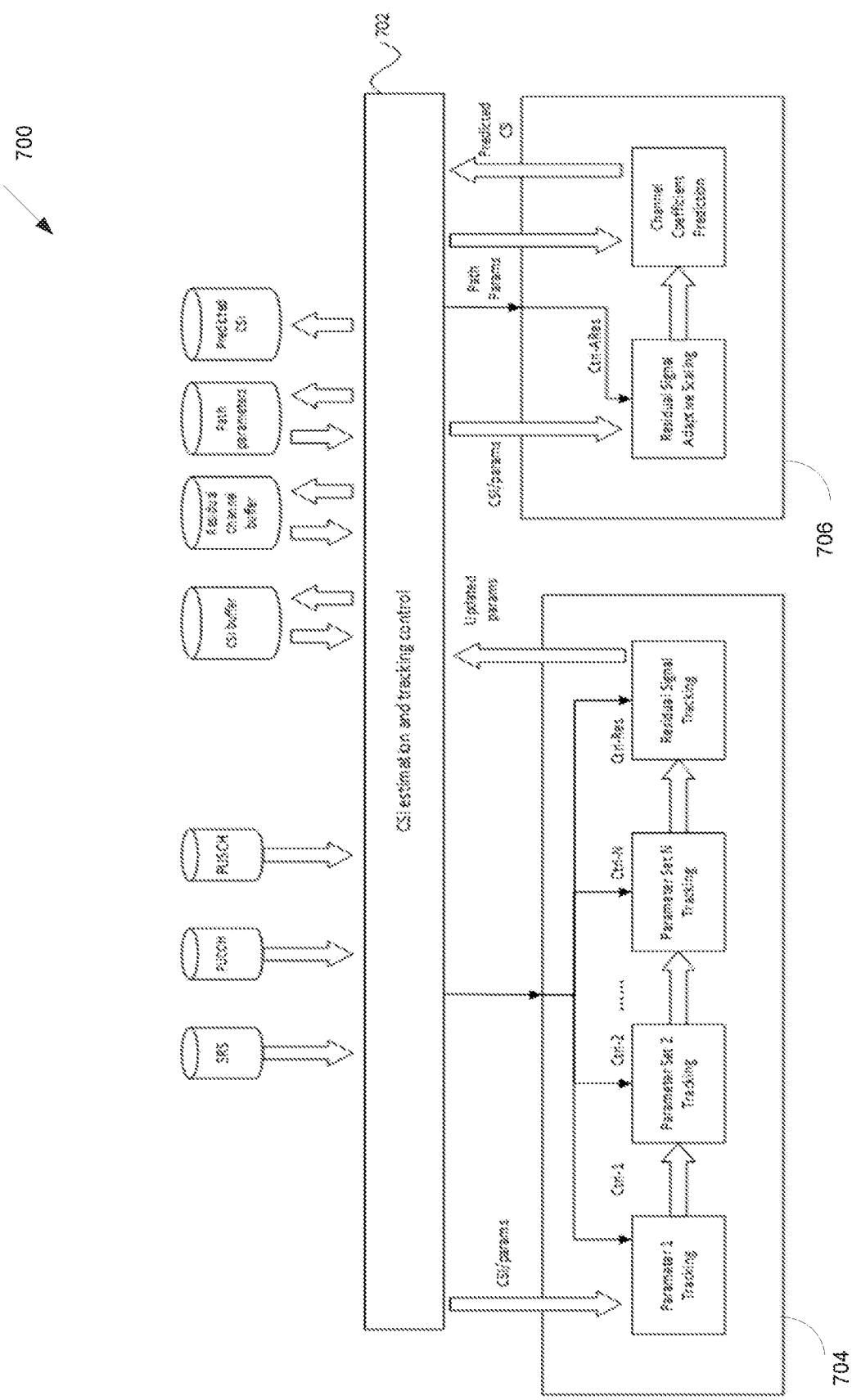
FIG. 7 illustrates an example CSI estimation architecture according to embodiments of the present disclosure.

FIG. 7 illustrates an example CSI estimation architecture 700 according to embodiments of the present disclosure. An embodiment of the CSI estimation architecture 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, CSI estimation and tracking control in 702 receives new CSI measurements from SRS, PUCCH or PUSCH at time to, and then adds new information into the CSI buffer. Configuration and triggers operation are determined for different processing modules. The updated channel parameters and predicted CSI are stored into designated buffers, when updating from channel parameter tracking unit 704 and channel coefficient prediction unit 706.

Channel parameter tracking unit 704 uses stored CSI and previous path parameters, triggers a series of parameter tracking modules based on control signals from 702, calculates new channel path parameters and residual channel response, and outputs updated information to 702. Channel coefficient prediction unit 706 uses residual channel response and updated path parameters, triggers adaptive scaling of residual signal, predicts the channel coefficient, and outputs predicted CSI to 702.

In time division duplexing (TDD) mMIMO systems, one method for a BS to obtain DL CSI is to utilize channel reciprocity. The predicted DL channel can be used by other functional blocks in the BS to improve system performance. For example, the predicted DL channel helps the scheduler to optimize resource allocation between different UEs, and to increase the accuracy of DL precoder and performance of DL MU-MIMO transmission by reducing the inter-user interference.

In one embodiment, CSI estimation and tracking control module takes uplink channel information, decides configurations of different parameter tracking modules, triggers the operations of different parameter tracking modules and update data buffers that hold channel and parameter estimates.

In one embodiment, the channel parameter tracking unit tracks the difference between input CSI and reconstructed CSI based on a parametric model. Channel coefficient prediction unit further filters the difference based on control signals and combines with prediction from a parametric model.

In one embodiment, the BS implements a filtering method to track channel path weights (e.g., Gamma) based on past CSI and path parameters, and outputs updated path weights needed in other parameter tracking modules and the channel coefficient prediction module.

One embodiment of the parametric channel model is a multipath channel model. The parameters are updated upon receiving, by a BS, new SRS measurements. One embodiment of the present disclosure adopts a multipath channel model, where the time-frequency channel response h(t, f) is modeled as a sum of contributions from several multipath components (MPC). The model assumes the channel is constructed on a sum of basis waveforms. P sinusoidal waveforms, indexed by p=1, 2, ..., P, are used. Waveform p is parameterized by signal delays $\tau_p$ and signal Doppler shifts $\nu_p$, which spans both the time and frequency domain. Then, the channel at time t and frequency f on antenna k is a linear combination of the P basis waveforms: $h_k(t, f) = \sum_{p=1}^{P} \gamma_{k,p} e^{-j2\pi(f\tau_p - t\nu_p)}$.

The parameter set in this embodiment is antenna-dependent path weight $\{\gamma_{k,p}\}$, path delay $\{\tau_p\}$, and path Doppler $\{\nu_p\}$. Both path delay and path Doppler are considered common across different antennas.

One embodiment considers a vectorized signal model for SRS measurement, which denotes as s(τ, ν, γ). If the vectorization of H performs first along the frequency domain and secondly along the time domain, s(τ, ν, γ) is expressed by: s(τ, ν, γ)=vec{H}=B(τ, ν)·γ=B$_{tf}$(τ, ν) ◊ B$_f$(τ)·γ, where parameter vectors τ, ν∈R$^P$, and path weights γ∈C$^P$.

Also, operator ◊ represents Khatri-Rao product, which is a column-wise Kronecker product. An example of the Khatri-Rao product between two 2×2 matrices is given by:

$$A \diamond B = \begin{bmatrix} a_{11} & a_{12} \\ a_{21} & a_{22} \end{bmatrix} \diamond \begin{bmatrix} b_{11} & b_{12} \\ b_{21} & b_{22} \end{bmatrix} = \begin{bmatrix} a_{11}b_{11} & a_{12}b_{12} \\ a_{11}b_{21} & a_{12}b_{22} \\ a_{21}b_{11} & a_{22}b_{12} \\ a_{21}b_{21} & a_{22}b_{22} \end{bmatrix} \cdot B_f(\tau)$$

is a matrix-valued function, $$R^P \to C^{N_{rb} \times P}$$

and represents the difference among sub-bands due to path delay, and p-th column can be expressed by:

$$[B_f(\tau)]_p = e^{-j2\pi x_1 \delta_f \tau_p}, \text{ where } x_1 = [0, 1, \ldots, N_{rb} - 1]^T \cdot \delta_f$$

denotes the frequency spacing of RB. In the case of fullband SRS sounding, N$_{rb}$ is replaced by $$N_{rb}^{SRS},$$

which is 96 for 20 MHz bandwidth and 48 for 10 MHz bandwidth in LTE. In the case of subband hopping SRS, N$_{rb}$ is 24 for a quarter band of 20 MHz total bandwidth and 12 for a quarter band of 10 MHz total bandwidth. Similarly, B$_{tf}$(τ, ν) is also a matrix-valued function.

In one embodiment where SRS is updated on a fraction of the total bandwidth every Δt seconds, B$_{tf}$( ) represents the inter-band SRS response over time, which depends on both delay τ and Doppler ν in the hopping SRS case, and only Doppler ν in the full-band SRS case.

For the hopping SRS, the input and output mapping of $$B_{tf}(\tau, \nu) \text{ is } (R^P, R^P) \to C^{N_{srs} \times P}$$

and p-th column can be expressed by:

$$[B_{tf}(\tau, v)]_p = e^{-j2\pi(m\delta_f \tau_p - n\Delta t v_p)},$$

where n is the time index sequence of SRS in the processing buffer. For example, if the latest SRS is treated as the reference, $n=[-n_{srs}+1, -n_{srs}+2, \ldots, 0]^T$. m is the corresponding starting frequency index of each hopping subband SRS.

For the full-band SRS, the input and output mapping of $$B_{tf}(v) \text{ is } R^P \to C^{N_{srs} \times P}$$

and p-th column can be expressed by:

$$[B_{tf}(v)]_p = e^{j2\pi n\Delta t v_p}.$$

To extend the vectorized signal model for multiple BS antennas. It may be assumed that path delays and Dopplers are common across $N_{ant}$ antennas. Therefore, the following channel model is considered: $s(\tau, v, \Gamma) = \Gamma \diamond B_{tf}(\tau, v) \diamond B_f(\tau) \cdot 1$, where $\Gamma$ is a path weight matrix with dimension $N_{ant} \times P$, and each row of $\Gamma$ contains path weights for one antenna. 1 stands for an all-one column vector with dimension P×1. Similarly, $B_{tf}(\tau, v)$ is replaced by $B_{tf}(v)$ for the fullband SRS. The received SRS is corrupted with additive white complex Gaussian noise, which models the uplink thermal noise and interference.

$y_{srs} = s(\tau, v, \Gamma) + n_0$, here $n_0$ is the noise vector and follows a zero-mean complex Gaussian distribution with a covariance matrix $R_n$. In current algorithm development, $R_n$ is configured to be a diagonal matrix $$\sigma_n^2 I.$$

The parameter $\sigma_n^2$ depends on uplink noise and interference power level, which is assumed to be fed by external modules. In further optimization, $R_n$ can be computed dynamically based on the residual power level at the n-th time instant.

Figure 8:
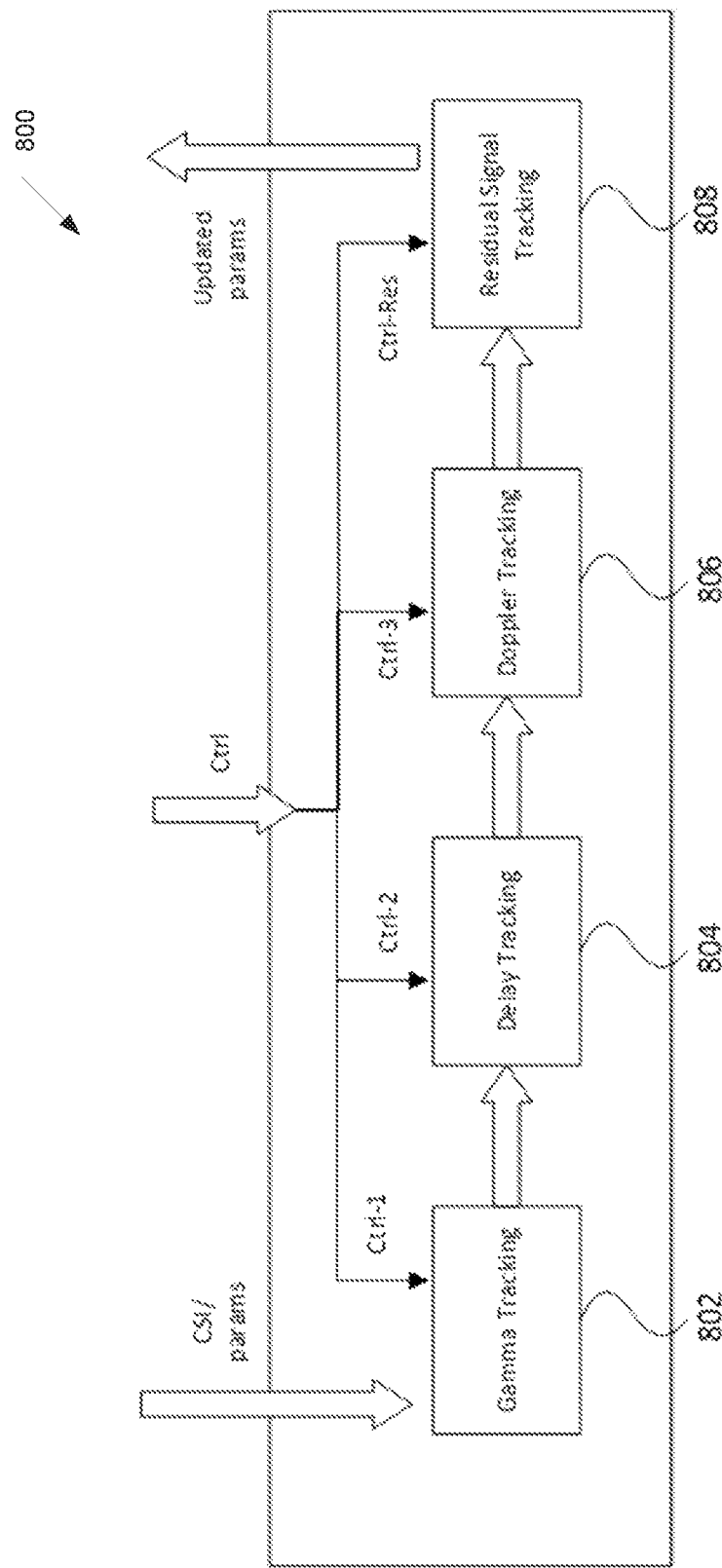
FIG. 8 illustrates an example CSI estimation operation according to embodiments of the present disclosure.

As illustrated in FIG. 7, one embodiment of CSI estimation and control unit 702 is to trigger all parameter tracking modules in 704 with default parameters. Another embodiment is to configure the tracking units to use a smaller number of time domain SRS samples, when sudden changes occur in channel statistics such as average power, delay spread or Doppler spread calculated based on CSI. Another embodiment of 702 is to configure (e.g., 802 as illustrated in FIG. 8), to operate in least square method when the first tracking snapshot or the previous Gamma tracking is skipped. Another embodiment of 802, as illustrated in FIG. 8, is to skip delay tracking (e.g., 804 as illustrated in FIG. 8), as illustrated in FIG. 8, when SRS or DMRS may have limited frequency domain samples.

One embodiment of channel parameter tracking unit 704 is in FIG. 7. Path parameters are divided three subsets, which are path weights (Gamma), path delay and path Doppler. The parameter-tracking unit comprises tracking modules to update one particular subset of parameters at one time, while fixing the other subsets of parameters. The parameter-tracking unit operates in a sequential manner where Gamma is updated first, delay is updated second, and Doppler is updated last. The parameter-tracking unit responds to external input control signals from 702, so that different algorithm configurations can be applied or certain tracking modules can be turned off.

FIG. 8 illustrates an example CSI estimation operation 800 according to embodiments of the present disclosure. An embodiment of the CSI estimation operation 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, the inputs are previous parameters and stored CSI. In this embodiment, the parameter update happens in a sequential order with Gamma update, delay update and Doppler update, as illustrated by operations 802, 804, and 806 in FIG. 8. One embodiment of perform residual signal tracking 808 calculates the difference between the reconstructed channel at the last SRS snapshot, $\hat{h}_{k,m,n}$ and the last SRS snapshot $$y_{k,m,n} = (h_{k,m,n} + n_{k,m,n}),$$

where $n_{k,m,n}$ is noise. The expression for the residual signal at time n is given by:

$$y_{k,m,n}^{res} = y_{k,m,n} - \hat{h}_{k,m,n}.$$

As illustrated in FIG. 8, for Gamma tracking (e.g., operation 802), one embodiment uses adaptive filtering methods, such as Kalman filter (KF). The aforementioned embodiment first predicts state and error covariance matrix based on state transition model and past state information, secondly calculates the correction of state variables based on the predicted state variables and new data and generates the final estimated variables. This embodiment updates Gamma (path weight) per antenna basis for the P tracked paths concurrently.

Denote $\gamma_k(n) = [\gamma_{k,1} \ldots \gamma_{k,P}]^T$ the path weights at SRS capture instance n for antenna k. It may be assumed that the below Gauss-Markov model for path weight evaluation is given by: $\gamma_k(n) = A_\gamma \gamma_k(n-1) + B_\gamma u(n)$, where $A_\gamma$ and $B_\gamma$ are fixed matrices of dimension P×P and are common to all antennas. It may be assumed that the state noise u(n) is independent from SRS capture to capture and is uncorrelated among paths, e.g., $u(n) \sim N(0, \sigma_u^2 I)$. Note that in practice, u(n) can be correlated in both time and path, since u(n) is a combined effect of dense multipath components (DMC) that are not captured in the tracked paths.

The state transition matrix is $A_\gamma = \sigma_A^2 D_{n-1}(1)$, where $D_j(i)$ is a diagonal matrix representing the theoretical phase progression due to Doppler effect, based on Doppler estimation at time j, between two SRS captures with time gap i:

$$D_j(i) = \text{diag}(e^{j2\pi v_{1,j} \Delta ti} \ldots e^{j2\pi v_{P,j} \Delta ti}).$$

That is:

$$D_{n-1}(1) = \text{diag}(e^{j \cdot 2\pi v_{1,n-1} \Delta t} \ldots e^{j \cdot 2\pi v_{P,n-1} \Delta t}).$$

In the above, it may be assumed that during the duration of $\Delta t$ the path Doppler remains constant and is approximated by estimate $v_{p,n-1}$. For example, for $\Delta t=20$ ms, path Doppler may change about 1 Hz, that is only about 7 degrees difference.

The scaling factor $\sigma_A^2$ can be tuned based on real measurement, and currently $\sigma_A^2=0.999$ is chosen to reflect the fact that the path weight gain remains roughly the same between two adjacent SRS captures.

Measurement equation for $\gamma_k(n)$ is linear given known path delay and Doppler. The channel response at frequency f and latest SRS capture instance n is:

$$h_k(f, n) = \sum_{p=1}^{P} \gamma_{k,p}(n) \cdot e^{-j2\pi f \tau_p} + n_{k,f,n}, \text{ where}$$

$$f = f_1(n), \ldots, f_{N_{rb}}(n) \text{ and } f_m(n) = f_1(n) + (m-1) \cdot \Delta f_{rb}$$

is the frequency of the received $N_{rb}$ RBs of SRS at time n. $n_{k,f}$ is the noise.

Write in matrix format: $h_k(n) = B_n(\tau) \cdot \gamma_k(n) + n_{k,n}$, where $n_{k,n} = [n_{k,1,n} \ldots n_{k,N_{rb},n}]^T$ and the mth row of $$B_n(\tau) \text{ is } [B_n(\tau)]_m = \left[ e^{-j2\pi f_m(n)\tau_1}, \ldots, e^{-j2\pi f_m(n)\tau_P} \right].$$

The meaning of $B_n(\tau)$ is frequency response basis matrix at time n, and only depends on the path delays $\tau=[\tau_1, \ldots, \tau_P]^T$ and the starting RB frequency $f_1(n)$. In reality, the path delays can only be known from the previous estimates. To make this explicit dependency, denote $B_n(\tau_i)$ the frequency response basis matrix using the path delay estimates $\tau_i$ obtained at time i. Therefore, the following equation are given by:

$$[B_n(\tau_i)]_m = \left[ e^{-j2\pi f_m(n)\tau_{1,i}}, \ldots, e^{-j2\pi f_m(n)\tau_{P,i}} \right].$$

In path weight update, it may be observed that including a few past SRS signal is necessary according to extensive evaluation using field captures, especially for sub-band SRS. One reason may be that only using the latest SRS signal may not provide sufficient measurements to stably update $\gamma_k(n)$. Consider $N_\gamma$ SRSs being used, i.e., SRS captured at n, n−1, . . . , n−$N_\gamma$+1. Certain assumption has to be made to relate current $\gamma_k(n)$ to the past SRS signals. For n−i, the signal model for SRS n−i is: $h_k(n-i) = B_{n-i}(\tau_{n-1}) \cdot D_{n-1}(-i) \cdot \gamma_k(n) + n_{k,n-i}$.

Note that in the above equation, the complex path weight is always referenced to the current SRS capture instance n, and the past path weights at n−i, i=1 . . . $N_\gamma$−1, are assumed to have only phase evolution according to Doppler effect but the amplitude remains the same. Also, the path delay for all SRS captures is assumed to be identical to the latest estimate at n−1 (for SRS at n the path delay is not used for updating delay and Doppler at this point of time).

The overall measurement equation with $N_\gamma$ SRS can be written in a matrix format:

$$h_{k,N_\gamma}(n) = \begin{bmatrix} B_n(\tau_{n-1}) \\ \vdots \\ B_{n-N_\gamma+1}(\tau_{n-1}) \cdot D_{n-1}(-(N_\gamma-1)) \end{bmatrix} \cdot \gamma_k(n) = B_{N_\gamma}(\tau_{n-1}) \gamma_k(n) + n_k,$$

where $h_{k,N_\gamma}(n) = [h_k(n); \ldots; h_k(n-N_\gamma+1)]$ and $n_k = [n_{k,n}; \ldots; n_{k,n-N_\gamma+1}]$ is the measurement noise. In reality, the measurement noise includes both additive white Gaussian noise (AWGN) noise and the residual un-captured DMC power, which in general is correlated in both time and frequency:

$$E\left[ n_k \cdot n_k^H \right] = C_w(n).$$

Denote $\hat{\gamma}_k(n) = [\gamma_{k,1} \ldots \gamma_{k,P}]^T$ the estimated path weight for antenna k with using SRS n. The difference between $\hat{\gamma}_k(n)$ and $\gamma_k(n)$ is that the former is the estimated value and the latter is true value. Since only estimated value is available, for simplicity $\gamma_k(n)$ is used to represent the estimated value in the sequel.

Figure 9:
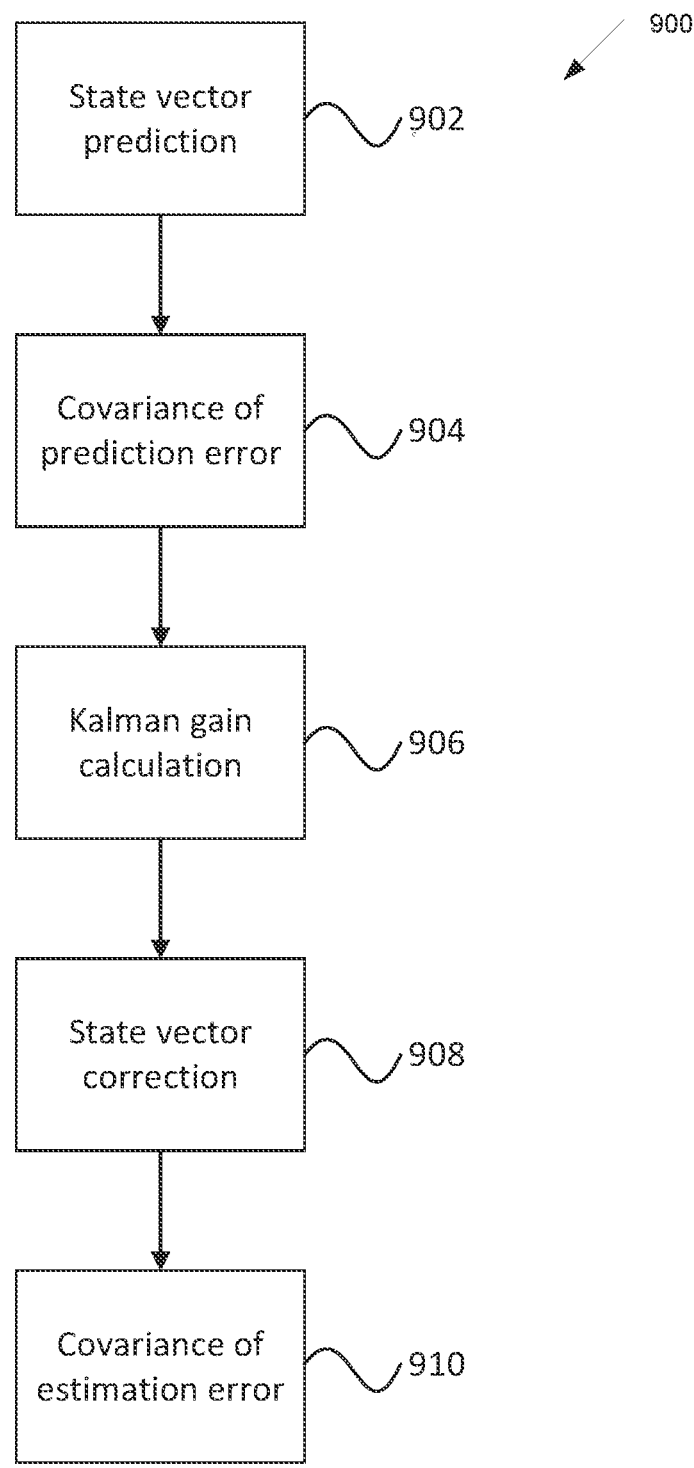
FIG. 9 illustrates a flowchart of a method for adaptive filtering according to embodiments of the present disclosure.

FIG. 9 illustrates a flowchart of a method 900 for adaptive filtering according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

Assume initial path parameter acquisition is completed at n=0. Now a KF based method is described for $\gamma_k(n)$, n≥1. As illustrated in FIG. 9, upon receiving SRS signal n, do the following step 902 to step 910 in FIG. 9.

In step 902, state vector prediction is performed: $\gamma_k(n|n-1) = A_\gamma \cdot \gamma_k(n-1)$. Note that $A_\gamma$ is common to all antennas.

In step 904, the covariance of prediction error is computed in $\gamma_k(n|n-1)$: $M_\gamma(n|n-1) = A_\gamma M_\gamma(n-1) A_\gamma^H + \sigma_u^2 I$. Note that $M_\gamma(n|n-1)$ is common to all antennas.

In step 906, Kalman is calculated gain: $K_\gamma(n) = M_\gamma(n|n-1) \cdot B_{N_\gamma}^H(\tau_{n-1}) (C_w(n) + B_{N_\gamma}(\tau_{n-1}) M_\gamma(n|n-1) B_{N_\gamma}^H(\tau_{n-1}))^{-1}$.

The above formula is not suitable for computation due to large matrix inversion size. Use Matrix inversion lemma and some approximation to simplify a calculation.

$$K_\gamma(n) = \left( M_\gamma^{-1}(n|n-1) + B_{N_\gamma}^H(\tau_{n-1}) C_w^{-1}(n) B_{N_\gamma}(\tau_{n-1}) \right)^{-1} B_{N_\gamma}^H(\tau_{n-1}) C_w^{-1}(n).$$

Assume the measurement noise is uncorrelated: $C_w(n) = \sigma_w^2 I$, the above equation may be simplified as: $K_\gamma(n) = (M_\gamma^{-1}(n|n-1) \sigma_w^2 + B_{N_\gamma}^H(\tau_{n-1}) B_{N_\gamma}(\tau_{n-1}))^{-1} B_{N_\gamma}^H(\tau_{n-1})$ which is used as Kalman gain calculation. Note that $K_\gamma(n)$ is common to all antennas.

In step 908, state vector correction is performed: $\gamma_k(n) = \gamma_k(n|n-1) + K_\gamma(n)(h_{k,N_\gamma}(n) - B_{N_\gamma}(\tau_{n-1}) \gamma_k(n|n-1))$.

In step 910, the covariance of estimation error is computed in $\gamma_k(n)$: $M_\gamma(n)=(I-K_\gamma(n)B_{N_\gamma}(\tau_{n-1}))\cdot M_\gamma(n|n-1)=M_\gamma(n|n-1)-K_\gamma(n)B_{N_\gamma}(\tau_{n-1})M_\gamma(n|n-1)$. Note that $M_\gamma(n)$ is common to all antennas.

Parameter choices are provided as shown following.

In one example, for n=1, initial path weights $\gamma_k(0)$ and measurement matrix $B_{N_\gamma}(\tau_0)$ are from initial path parameter acquisition.

In one example, for n≥1, $B_{N_\gamma}(\tau_{n-1})$ is calculated based on delay and Doppler estimated during tracking stage with update from SRS at time n−1.

In one example, $\tau_w^2$ can include both additive noise and interference as well as the DMCs not captured by the tracked paths. Based on experiment, $\tau_w^2$ can be relative value to the tracked path power and can be further optimized based on actual tuning.

In one example, $\sigma_u^2$ can be relative value to the tracked path power and can be configured based on actual tuning.

Another embodiment is to use least square (LS) based method. A switch to LS based method from KF based method can be easily configured. The procedures to configure KF based tracking to LS are provided here. In this embodiment, step 902 is skipped. In step 904, the covariance of prediction error in $\gamma_k(n|n-1)$ is set as a zero matrix. In step 906, Kalman gain is calculated. In this case, the LS normal equation is calculated (with a regularization factor): $K_\gamma(n)=(\sigma_w^2 I+B_{N_\gamma}^H(\tau_{n-1})B_{N_\gamma}(\tau_{n-1}))^{-1}B_{N_\gamma}^H(\tau_{n-1})$. In step 708, state vector correction is performed: $\gamma_k(n)=\gamma_k(n|n-1)+K_\gamma(n)(h_{k,N_\gamma}(n)-B_{N_\gamma}(\tau_{n-1})\gamma_k(n|n-1))=K_\gamma(n)h_{k,N_\gamma}(n)$. In step 710, the covariance of estimation error is computed in $\gamma_k(n)$: skipped.

For delay tracking (e.g., operation 804), one embodiment uses adaptive filtering methods, such as extended Kalman filter (EKF). The aforementioned embodiment first predicts state and error covariance matrix based on state transition model and past state information, secondly calculates the correction of state variables based on the predicted state variables and new data and generates the final estimated variables. Path delay are common across different antennas and P tracked delays are updated concurrently. Other path parameters such as path weights and path Doppler are fixed while updating path delay.

The new information along with the prior knowledge about the channel parameters such as path delay, path Doppler and path weights are combined to update path delay. One embodiment of delay update is an EKF-based estimation framework. A dynamic state space model is assumed for path delay, where it may be assumed that the dynamic state space model follows a random walk process and is perturbed by independent and identical distributed (i.i.d.) random Gaussian noise $w_{\tau,n}$ at each time instant: $\tau_n=\tau_{n-1}+w_{\tau,n}$.

The observation equation uses the following the signal model.

$$y_{srs}=s(\tau,v,\Gamma)+n_0.$$

If path Doppler v and path weights T are fixed, there is a nonlinear mapping from path delay τ to the observation vector. A traditional KF may not work with a nonlinear observation equation, and one has to rely on EKF to linearize the observation equation around the predicted values of the state vector. The path weight matrix Γ can be constructed by stacking path weight vector $\gamma_k^T$ for k-th antenna in the row direction, which has a dimension of $$N_{ant} \times P: \Gamma = \begin{bmatrix} \gamma_1^T \\ \vdots \\ \gamma_{N_{ant}}^T \end{bmatrix}.$$

In the delay tracking/update function block (e.g., operation 804), the state vector consists of path delays τ from P paths. At n-th time instant, the inputs to this function block are previous path delays $\tau_{n-1}$, prior error covariance matrix $P_{\tau,n-1}$, updated path weights $\Gamma_n$ and previous path Doppler $v_{n-1}$. The outputs of this function block are updated path delays $\tau_n$ and error covariance matrix $P_{\tau,n}$.

Figure 10:
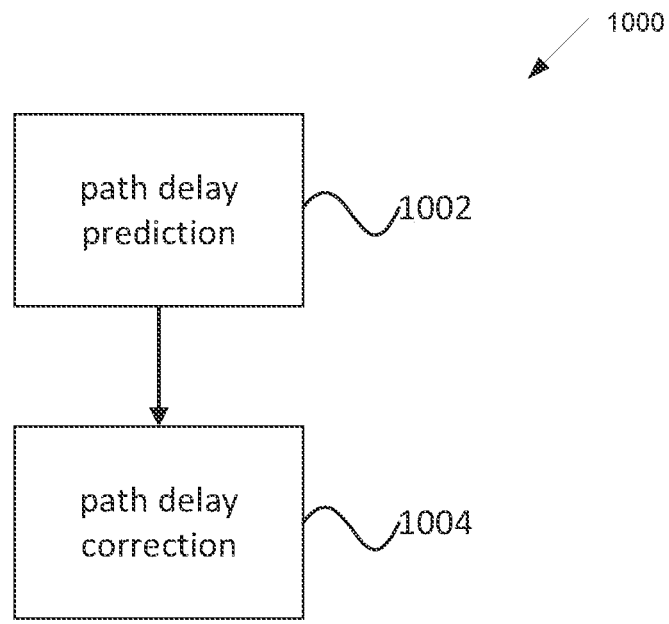
FIG. 10 illustrates a flowchart of a method for path delay correction according to embodiments of the present disclosure.

FIG. 10 illustrates a flowchart of a method 1000 for path delay correction according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

The main steps of path delay tracking follow FIG. 10, which are summarized as follows.

In step 1002, predicted path delay and error covariance matrix are generated.

$$\tau_{n|n-1} = \Phi_\tau \tau_{n-1}; P_{\tau,n|n-1} = \Phi_\tau P_{\tau,n-1}\Phi_\tau^T + Q_\tau \text{ where } \Phi_\tau$$

is the state transition matrix with dimension P×P. In one embodiment, $\Phi_\tau$ is an identity matrix and can be configurable in other embodiments. $Q_\tau$ is the state noise covariance matrix for path delay with dimension P×P, and computed by $Q_\tau=\alpha_\tau \Delta t I_P$. $\alpha_\tau$ represents the state noise of path delay and is assumed to be the same among P paths. The parameter $q_\tau$ is set to 1e-2 in one embodiment, while the parameter $q_\tau$ is configurable in other embodiments.

In step 1004, corrected path delay and error covariance matrix are generated:

$$P_{\tau,n} = (P_{\tau,n|n-1}^{-1} + J_\tau(\tau_{n|n-1}, v_{n-1}, \Gamma_n, R_n))^{-1};$$

$$\Delta \tau_n = P_{\tau,n} q_\tau(y_{srs,n}; \tau_{n|n-1}, v_{n-1}, \Gamma_n, R_n);$$

$$\tau_n = \tau_{n|n-1} + \Delta \tau_n \cdot q_\tau(y_{srs,n}; \tau_{n|n-1}, v_{n-1}, \Gamma_n, R_n)$$

is the score-function with dimension P×1, and can be computed by $$q_\tau(y_{srs,n}; \tau_{n|n-1}) = 2Re\{D_\tau^H R_n^{-1} y_{srs,n}\} \cdot J_\tau(\tau_{n|n-1}, v_{n-1}, \Gamma_n, R_n)$$

is Fisher information matrix (FIM) with dimension P×P, which can be computed by $J_\tau=2Re\{D_\tau^H R_n^{-1} D_\tau\}$. $R_n$ is the residual error covariance matrix of the measurement process, which is common among path delay tracking and Doppler tracking. $R_n$ is set to $\sigma_w^2 I$ by default. $D_\tau$ denotes the Jacobian matrix and is computed as $$\frac{\partial s}{\partial \tau^T}.$$

$$D_\tau = \frac{\partial s(\theta)}{\partial \tau^T} = \Gamma \diamond \frac{\partial B_{tf}(\tau,v)}{\partial \tau^T} \diamond B_f(\tau) + \Gamma \diamond B_{tf}(\tau,v) \diamond \frac{\partial B_f(\tau)}{\partial \tau^T}.$$

The partial derivatives are defined as:

$$\frac{\partial B_{tf}(\tau, v)}{\partial \tau^T} = \text{diag}(-j2\pi m\delta_f)[B_{tf}(\tau, v)]_p;$$

and $$\frac{\partial B_f(\tau)}{\partial \tau^T} = \text{diag}(-j2\pi x_1 \delta_f)[B_f(v)]_p.$$

Because the dimension of the state vector P is much smaller than the dimension of the observation vector $N_{tot}$. The alternative form of EKF is considered here, which is also known as the information form.

In some embodiments, there may require some preprocessing for $\tau_{n-1}$ if SRS measurements are contaminated by timing offset correction initiated by UE. The delay state vector in the previous iteration, $\tau_{n-1}$, was updated using the SRS channel estimate buffer. The state vector may also be updated by the amount of TO correction using: $\tau_{n-1} \leftarrow \tau_{n-1} + 1_{TO}T_s \cdot 2\pi\delta_f \cdot 1$, where 1 is a column vector with all elements being 1 and with the same dimension of $\tau_{n-1}$, $1_{TO}T_s$ is the amount of TO correction in time unit and $2\pi\delta_f$ is the normalization factor. $T_s$ is the basic time unit.

For Doppler tracking (e.g., 806), one embodiment uses adaptive filtering methods, such as EKF. The aforementioned embodiment first predicts state and error covariance matrix based on state transition model and past state information, secondly calculates the correction of state variables based on the predicted state variables and new data and generates the final estimated variables. Path Doppler are common across different antennas and P tracked Dopplers are updated concurrently. Other path parameters such as path weights and path delay are fixed while updating path Doppler.

The path Doppler tracking is preceded by the path delay tracking. The input to this function block are previous path Doppler shifts $v_{n-1}$, prior error covariance matrix $P_{v,n-1}$, updated path weights $\Gamma_n$ and path Delays $\tau_n$. The output of this function block are updated path Doppler shifts $v_n$ and error covariance matrix $P_{v,n}$.

Figure 11:
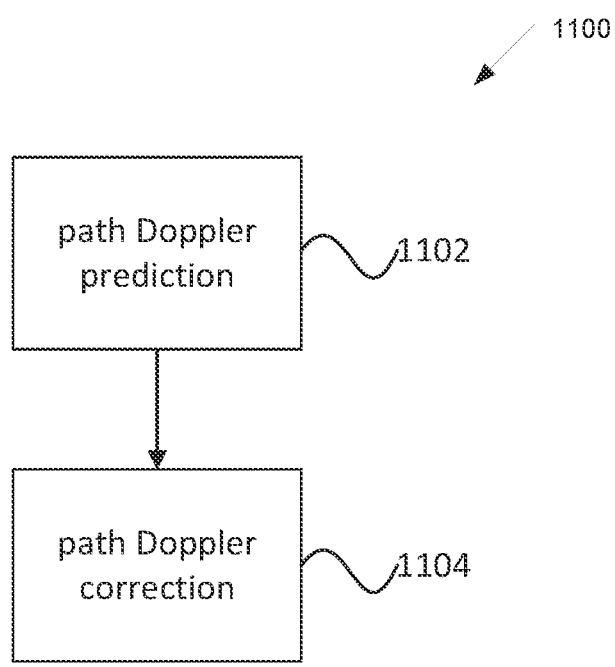
FIG. 11 illustrates a flowchart of a method for path doppler correction according to embodiments of the present disclosure.

FIG. 11 illustrates a flowchart of a method 1100 for path doppler correction according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

The main steps of path Doppler tracking follow FIG. 11 are summarized as following. In step 1102, predicted path Doppler and error covariance matrix are generated: $v_{n|n-1} = \Phi v_{n-1} = v_{n-1}$; $P_{v,n|n-1} = \Phi P_{v,n-1}\Phi^T + Q_v = P_{\tau,n-1} + Q_v$, where $Q_v$ is the state noise covariance matrix for path Doppler with dimension P×P, and is computed by $Q_v = \alpha_v \Delta t I_P$. $\alpha_v$ represents the state noise of path delay and is assumed to be the same among P paths. In step 1104, updated path Doppler and error covariance matrix are generated:

$$P_{v,n} = \left(P_{v,n|n-1}^{-1} + J_v(\tau_n, v_{n|n-1}, \Gamma_n, R_n)\right)^{-1};$$

$$\Delta v_n = P_{v,n}q_v(y_{srs,n}; \tau_n, v_{n|n-1}, \Gamma_n, R_n); \text{ and } v_n = v_{n|n-1} + \Delta v_n.$$

$q_v(y_{srs,n}; v_{n|n-1})$ is the score-function with dimension P×1, and can be computed by $$q_v(y_{srs,n}; v_{n|n-1}) = 2Re\{D_v^H R_n^{-1} y_{srs,n}\} \cdot J_v(\tau_n, v_{n|n-1}, \Gamma, R_n)$$

is the Fisher information matrix with dimension P×P, which can be computed by $$J_v = 2Re\{D_v^H R_n^{-1} D_v\} \cdot D_v$$

denotes the Jacobian matrix and is computed as $$\frac{\partial s}{\partial v^T}.$$

$$D_v = \frac{\partial s(\theta)}{\partial v^T} = \Gamma \diamond \frac{\partial B_{tf}(\tau, v)}{\partial v^T} \diamond B_f(\tau).$$

The partial derivative is defined as:

$$\frac{\partial B_{tf}(\tau, v)}{\partial v^T} = \text{diag}(j2\pi n \Delta t)[B_{tf}(\tau, v)]_p.$$

In one embodiment, channel coefficient prediction module 706 in FIG. 7 predicts channel coefficients for different frequency points and antennas, which is used by a BS to generate BF weights for DL MU-MIMO transmission. The channel coefficient prediction module generates predicted channel coefficients by adding up prediction based on updated path parameters and adaptively scaled residual channel response.

For a particular time transmission interval (TTI), the predicted channel is defined by $\hat{h} \in \mathbb{C}^{N_{ant}N_{rb}^{BW} \times 1}$, and covers the entire bandwidth with $N_{rb}^{BW}$ being the total number of RBs. This step follows the following equation: $\hat{h} = \hat{h}_{path} + \hat{h}_{res}$.

It generates $\hat{h}_{path}$ based on the parametric channel model and updated path parameters($\Gamma,\tau,v$). $\hat{h}_{path} = \Gamma \diamond \tilde{B}(\tau,v, n_{TTI}) \cdot 1$, where $\tilde{B}(\tau,v, n_{TTI})$ is a modified basis matrix defined by:

$$[\tilde{B}(\tau, v, n_{TTI})]_p = e^{-j2\pi(x \cdot \Delta f_{rb}\tau_p - 1 \cdot n_{TTI}t_{TTI}v_p)},$$

where $[\tilde{B}(\tau, v, n_{TTI})]$ denotes the p-th column of $\tilde{B}(\tau, v, n_{TTI})$, x is a RB index vector that ranges the entire (or interested) RB, $t_{TTI}$ is the time duration of TTI in seconds, and $n_{TTI}$ is a targeting TTI index that is relative to the TTI in which the most recent SRS has been received.

It then calculates $\hat{h}_{res}$ by scaling the difference between the reconstructed channel at the last SRS snapshot, $\hat{h}_{k,m,n}$ and the last SRS snapshot $y_{k,m,n} = (h_{k,m,n} + n_{k,m,n})$, where $n_{k,m,n}$ is noise. The expression for the residual signal at time n is given by: $y_{k,m,n}^{res} = y_{k,m,n} - \hat{h}_{k,m,n}$. The total residue power, totPwr, is computed as: totPwr=$\Sigma_k \Sigma_m y_{k,m,n}^{res*} y_{k,m,n}^{res}$.

The noise power, noisePwr, is approximated as: noisePwr=$(\Sigma_k \Sigma_m y_{k,m,n}^* y_{k,m,n})$. 10-SRS SINR_dB/10.

The scaling factor, scale, is computed as: scale=max (totPwr−noisePwr/totPwr,0). The scaled residue signal. $(y_{k,m,n}^{res})'$, is computed as: $(y_{k,m,n}^{res})'$=scale·$y_{k,m,n}^{res}$.

The parameter update framework has shown a better numerical stability over the other joint parameter update in simulations. The following figure shows the comparison of matrix condition numbers between two parameter update frameworks. The right subfigure uses the framework outlined in 704, which shows a much smaller condition number and better numerical stability compared to the joint parameter update in the left subfigure.

Figure 12:
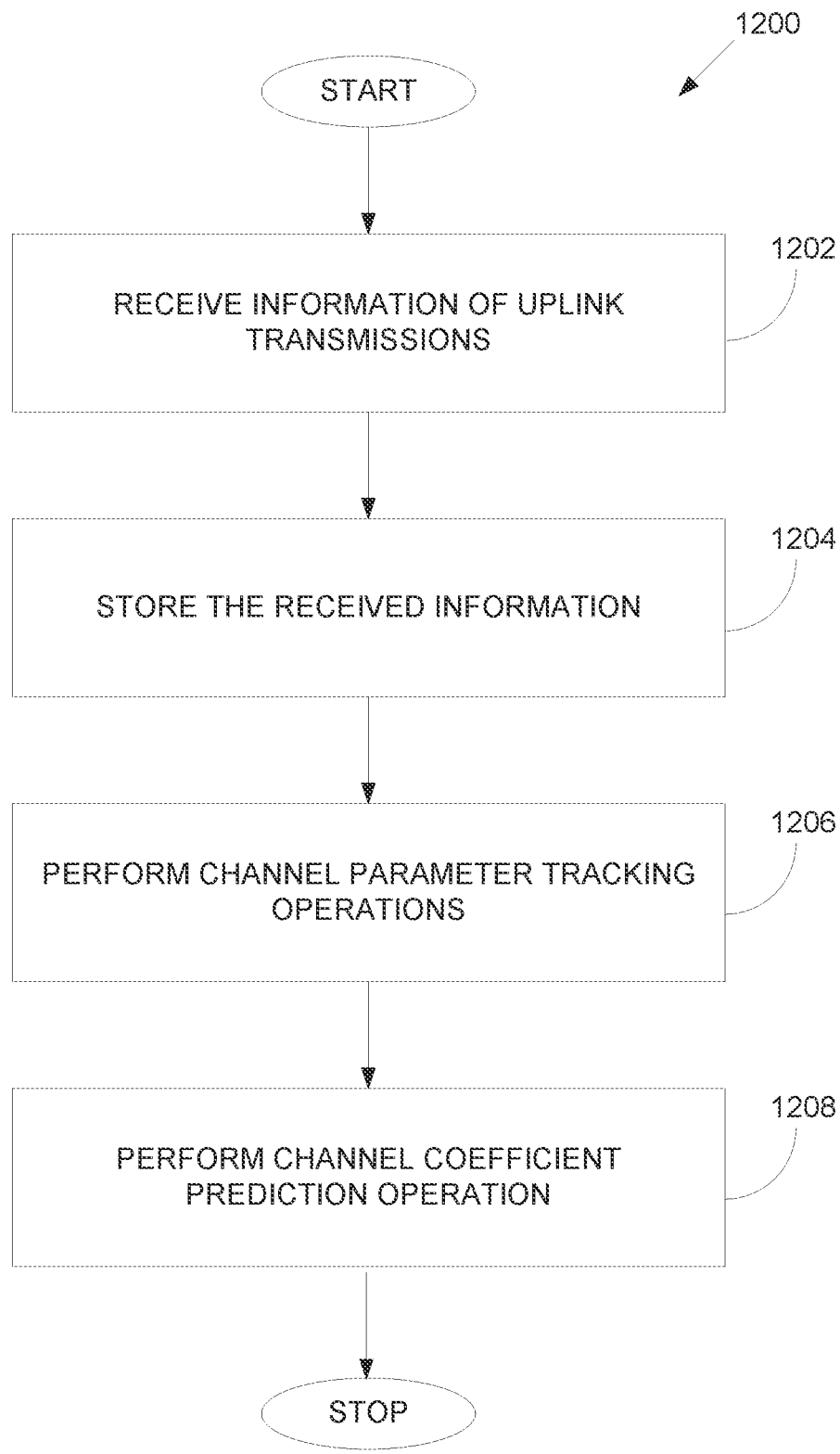
FIG. 12 illustrates a flowchart of a method for parameter tracking for CSI estimation according to embodiments of the present disclosure.

FIG. 12 illustrates a flowchart of a method 1200 for parameter tracking for CSI estimation according to embodiments of the present disclosure, as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, a BS receives information of uplink transmissions.

Subsequently, the BS in step 1204 stores the received information.

Next, the BS in step 1206 performs, based on the received information, channel parameter tracking operations to generate channel parameters, wherein the channel parameter tracking operations are configured with different configuration parameters.

Finally, the BS in step 1208 performs, based on the channel parameters, a channel coefficient prediction operation to generate channel state information (CSI).

In on embodiment, the BS stores the channel parameters and the CSI in at least one buffer, wherein the CSI is predicted CSI based on the received information of uplink transmission and the channel parameters are updated channel parameters based on the received information of uplink transmission and identifies, based on the received information of the uplink transmissions, the different configuration parameters for the channel parameter tracking operations, the uplink transmissions comprising sounding reference signals (SRSs), a physical uplink channel (PUCCH), or a physical uplink shared channel (PUSCH).

In such embodiment, the different configuration parameters are identified to selectively track and update the channel parameters based on the received information of the uplink transmissions, the different configuration parameters being adjusted for the channel parameter tracking operations.

In one embodiment, the BS, in response to generating the channel parameters and the CSI, updates the at least one buffer with the channel parameters and the CSI, wherein the at least one buffer includes previously stored channel parameters and CSI.

In one embodiment, the BS generates, based on the received information of the uplink transmissions, control information including different configuration parameters for the channel parameter tracking operations and tracks, by the channel parameter tracking operations, differences between the CSI and currently received CSI based on a parametric model including a multipath channel model.

In one embodiment, the BS sequentially triggers the channel parameter tracking operations based on the control information, wherein the channel parameter tracking operations is sequentially ordered in a gamma tracking operation including an adaptive filter, a delay tracking operation, a Doppler tracking operation, and a residual signal tracking operation and calculates the channel parameters and a residual channel response to generate the channel parameters.

In one embodiment, the BS identifies, using the channel parameters and the CSI, a scaling factor based on the residual channel response determined from the residual signal tracking operation and performs, based on the scaling factor, the channel coefficient prediction operation to generate the CSI.

In one embodiment, the BS performs filtering and scaling, using the scaling factor on differences between the CSI and the currently received CSI based on the control information, combines the differences between the CSI and the currently received CSI with the channel parameters and a parametric channel model, and identifies, based on the combined differences, channel path weights that are used for the channel coefficient prediction operation and the channel parameter tracking operations.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
    a transceiver configured to receive information of uplink transmissions; and
    a processor operably connected to the transceiver, the processor configured to:
        store the received information,
        perform, based on the received information, channel parameter tracking operations to generate channel parameters, wherein the channel parameter tracking operations are configured with different configuration parameters, and
        perform, based on the channel parameters, a channel coefficient prediction operation using a residual channel response and path parameters to generate channel state information (CSI).

2. The BS of claim 1, wherein:
    the processor is further configured to:
        store the channel parameters and the CSI in at least one buffer, wherein the CSI is a predicted CSI based on the received information of the uplink transmissions and the channel parameters are updated channel parameters based on the received information of the uplink transmissions, and identify, based on the received information of the uplink transmissions, the different configuration parameters for the channel parameter tracking operations, the uplink transmissions comprising sounding reference signals (SRSs), a physical uplink channel (PUCCH), or a physical uplink shared channel (PUSCH); and the different configuration parameters are identified to selectively track and update the channel parameters based on the received information of the uplink transmissions, the different configuration parameters being adjusted for the channel parameter tracking operations.

3. The BS of claim 2, wherein the processor is further configured to, in response to generating the channel parameters and the CSI, update the at least one buffer with the channel parameters and the CSI, the at least one buffer including previously stored channel parameters and CSI.

4. The BS of claim 1, wherein the processor is further configured to:

generate, based on the received information of the uplink transmissions, control information including the different configuration parameters for the channel parameter tracking operations; and track, by the channel parameter tracking operations, differences between the CSI and a previous CSI based on a parametric model including a multipath channel model.

5. The BS of claim 4, wherein the processor is further configured to:

sequentially trigger the channel parameter tracking operations based on the control information, the channel parameter tracking operations being sequentially ordered in a gamma tracking operation including an adaptive filter, a delay tracking operation, a Doppler tracking operation, and a residual signal tracking operation; and calculate the channel parameters and the residual channel response to generate the channel parameters.

6. The BS of claim 5, wherein the processor is further configured to:

identify, using the channel parameters and the CSI, a scaling factor based on the residual channel response determined from the residual signal tracking operation; and perform, based on the scaling factor, the channel coefficient prediction operation to generate the CSI.

7. The BS of claim 6, wherein the processor is further configured to:

perform filtering and scaling, using the scaling factor on differences between the CSI and the previous CSI based on the control information;

combine the differences between the CSI and the previous CSI with the channel parameters and a parametric channel model; and identify, based on the combined differences, channel path weights that are used for the channel coefficient prediction operation and the channel parameter tracking operations.

8. A method of a base station (BS) in a wireless communication system, the method comprising:

receiving information of uplink transmissions;

storing the received information;

performing, based on the received information, channel parameter tracking operations to generate channel parameters, wherein the channel parameter tracking operations are configured with different configuration parameters; and performing, based on the channel parameters, a channel coefficient prediction operation using a residual channel response and path parameters to generate channel state information (CSI).

9. The method of claim 8, further comprising:

storing the channel parameters and the CSI in at least one buffer, wherein the CSI is predicted CSI based on the received information of the uplink transmissions and the channel parameters are updated channel parameters based on the received information of the uplink transmissions; and identifying, based on the received information of the uplink transmissions, the different configuration parameters for the channel parameter tracking operations, the uplink transmissions comprising sounding reference signals (SRSs), a physical uplink channel (PUCCH), or a physical uplink shared channel (PUSCH), wherein the different configuration parameters are identified to selectively track and update the channel parameters based on the received information of the uplink transmissions, the different configuration parameters being adjusted for the channel parameter tracking operations.

10. The method of claim 9, further comprising, in response to generating the channel parameters and the CSI, updating the at least one buffer with the channel parameters and the CSI, wherein the at least one buffer includes previously stored channel parameters and CSI.

11. The method of claim 8, further comprising:

generating, based on the received information of the uplink transmissions, control information including the different configuration parameters for the channel parameter tracking operations; and tracking, by the channel parameter tracking operations, differences between the CSI and a previous CSI based on a parametric model including a multipath channel model.

12. The method of claim 11, further comprising:

sequentially triggering the channel parameter tracking operations based on the control information, wherein the channel parameter tracking operations is sequentially ordered in a gamma tracking operation including an adaptive filter, a delay tracking operation, a Doppler tracking operation, and a residual signal tracking operation; and calculating the channel parameters and the residual channel response to generate the channel parameters.

13. The method of claim 12, further comprising:

identifying, using the channel parameters and the CSI, a scaling factor based on the residual channel response determined from the residual signal tracking operation; and performing, based on the scaling factor, the channel coefficient prediction operation to generate the CSI.

14. The method of claim 13, further comprising:

performing filtering and scaling, using the scaling factor on differences between the CSI and the previous CSI based on the control information;

combining the differences between the CSI and the previous CSI with the channel parameters and a parametric channel model; and identifying, based on the combined differences, channel path weights that are used for the channel coefficient prediction operation and the channel parameter tracking operations.

15. A non-transitory computer-readable medium comprising program code, that when executed by at least one processor, causes a base station (BS) to:
- receive information of uplink transmissions;
- store the received information;
- perform, based on the received information, channel parameter tracking operations to generate channel parameters, wherein the channel parameter tracking operations are configured with different configuration parameters; and
- perform, based on the channel parameters, a channel coefficient prediction operation using a residual channel response and path parameters to generate channel state information (CSI).

16. The non-transitory computer-readable medium of claim 15, further comprising program code, that when executed by the at least one processor, causes the BS to:
- store the channel parameters and the CSI in at least one buffer, wherein the CSI is predicted CSI based on the received information of the uplink transmissions and the channel parameters are updated channel parameters based on the received information of the uplink transmissions; and
- identify, based on the received information of the uplink transmissions, the different configuration parameters for the channel parameter tracking operations, the uplink transmissions comprising sounding reference signals (SRSs), a physical uplink channel (PUCCH), or a physical uplink shared channel (PUSCH),
- wherein the different configuration parameters are identified to selectively track and update the channel parameters based on the received information of the uplink transmissions, the different configuration parameters being adjusted for the channel parameter tracking operations.

17. The non-transitory computer-readable medium of claim 16, further comprising program code, that when executed by the at least one processor, causes the BS to, in response to generating the channel parameters and the CSI, update the at least one buffer with the channel parameters and the CSI, wherein the at least one buffer includes previously stored channel parameters and CSI.

18. The non-transitory computer-readable medium of claim 15, further comprising program code, that when executed by the at least one processor, causes the BS to:
- generate, based on the received information of the uplink transmissions, control information including the different configuration parameters for the channel parameter tracking operations; and
- track, by the channel parameter tracking operations, differences between the CSI and a previous CSI based on a parametric model including a multipath channel model.

19. The non-transitory computer-readable medium of claim 18, further comprising program code, that when executed by the at least one processor, causes the BS to:
- sequentially trigger the channel parameter tracking operations based on the control information, wherein the channel parameter tracking operations is sequentially ordered in a gamma tracking operation including an adaptive filter, a delay tracking operation, a Doppler tracking operation, and a residual signal tracking operation; and
- calculate the channel parameters and the residual channel response to generate the channel parameters.

20. The non-transitory computer-readable medium of claim 19, further comprising program code, that when executed by the at least one processor, causes the BS to:
- identify, using the channel parameters and the CSI, a scaling factor based on the residual channel response determined from the residual signal tracking operation; and
- perform, based on the scaling factor, the channel coefficient prediction operation to generate the CSI,
- perform filtering and scaling, using the scaling factor on differences between the CSI and the previous CSI based on the control information;
- combine the differences between the CSI and the previous CSI with the channel parameters and a parametric channel model; and
- identify, based on the combined differences, channel path weights that are used for the channel coefficient prediction operation and the channel parameter tracking operations.

* * * * *